(12) United States Patent
Kim et al.

(10) Patent No.: US 11,817,239 B2
(45) Date of Patent: Nov. 14, 2023

(54) EMBEDDED VERTICAL INDUCTOR IN LAMINATE STACKED SUBSTRATES

(71) Applicant: QUALCOMM Incorporated, San Diego, CA (US)

(72) Inventors: Daniel Daeik Kim, Del Mar, CA (US); Bonhoon Koo, San Diego, CA (US); Babak Nejati, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 645 days.

(21) Appl. No.: 16/210,594

(22) Filed: Dec. 5, 2018

(65) Prior Publication Data

US 2019/0189327 A1    Jun. 20, 2019

Related U.S. Application Data

(60) Provisional application No. 62/599,397, filed on Dec. 15, 2017.

(51) Int. Cl.
 *H01F 27/36* (2006.01)
 *H01F 17/00* (2006.01)
 (Continued)

(52) U.S. Cl.
 CPC ....... *H01F 17/0013* (2013.01); *H01F 27/363* (2020.08); *H01F 41/041* (2013.01);
 (Continued)

(58) Field of Classification Search
 CPC .. H01F 17/0013; H01F 27/363; H01F 41/041; H01F 27/36; H01F 2017/002;
 (Continued)

(56) References Cited

U.S. PATENT DOCUMENTS 8,952,504 B2    2/2015  Gu et al.
2005/0150106 A1    7/2005  Long et al.
(Continued)

FOREIGN PATENT DOCUMENTS

CN    102270532 A    12/2011
JP    2005039007 A  *  2/2005  ........... H01L 23/552
(Continued)

OTHER PUBLICATIONS

International Search Report and Written Opinion—PCT/US2018/064782—ISA/EPO—dated Mar. 28, 2019.
Taiwan Search Report—TW107144500—TIPO—dated Jul. 29, 2022.

*Primary Examiner* — Tuyen T Nguyen
(74) *Attorney, Agent, or Firm* — Loza & Loza, LLP

(57) ABSTRACT

A vertical inductor structure includes a first laminate substrate forming a first portion of the vertical inductor structure and a second laminate substrate forming a second portion. Each laminate substrate includes a plurality of first traces embedded in a layer of the laminate substrate, a plurality of first vertical columns, and a plurality of second vertical columns. Each first vertical columns is coupled to a first end of a respective first trace, and each second vertical column is coupled to a second end of a respective first trace. The second laminate substrate is mounted on the first laminate substrate such that each first vertical column of the first laminate substrate is coupled to a respective first vertical column of the second laminate substrate, and each second vertical column of the first laminate substrate is coupled to a respective second vertical column of the second laminate substrate.

14 Claims, 9 Drawing Sheets

(51) Int. Cl.
*H01F 41/04* (2006.01)
*H04B 1/40* (2015.01)
*H04B 1/04* (2006.01)

(52) U.S. Cl.
CPC .............. *H04B 1/40* (2013.01); *H01F 27/36* (2013.01); *H01F 2017/002* (2013.01); *H01F 2017/008* (2013.01); *H04B 1/04* (2013.01)

(58) Field of Classification Search
CPC ....... H01F 2017/008; H04B 1/40; H04B 1/04; H05K 1/144; H05K 3/368; H05K 3/46
See application file for complete search history.

(56) References Cited

U.S. PATENT DOCUMENTS

| | | |
|---|---|---|
| 2008/0297299 A1 | 12/2008 | Yun et al. |
| 2010/0208439 A1 | 8/2010 | Oka |
| 2011/0291232 A1 | 12/2011 | Yen et al. |
| 2013/0020675 A1* | 1/2013 | Kireev ................ H01L 25/0655 257/E23.011 |
| 2014/0266544 A1 | 9/2014 | Leipold et al. |
| 2014/0353022 A1 | 12/2014 | Morita |
| 2015/0048465 A1 | 2/2015 | Gu et al. |
| 2015/0130021 A1 | 5/2015 | Kim et al. |
| 2015/0371751 A1 | 12/2015 | Kim et al. |
| 2015/0371764 A1 | 12/2015 | Gordin et al. |
| 2017/0062119 A1 | 3/2017 | Zybura et al. |
| 2017/0076853 A1 | 3/2017 | Valentin |
| 2017/0084378 A1 | 3/2017 | Leipold et al. |

FOREIGN PATENT DOCUMENTS

| | | | |
|---|---|---|---|
| JP | 2014160751 A | 9/2014 | |
| JP | 2014232837 A | 12/2014 | |
| JP | 2015026762 A | 2/2015 | |
| TW | 201440090 A | 10/2014 | |
| WO | WO-0137323 A2 * | 5/2001 | ......... H01F 27/2804 |
| WO | 2014024762 A1 | 2/2014 | |
| WO | 2014123783 | 8/2014 | |

\* cited by examiner

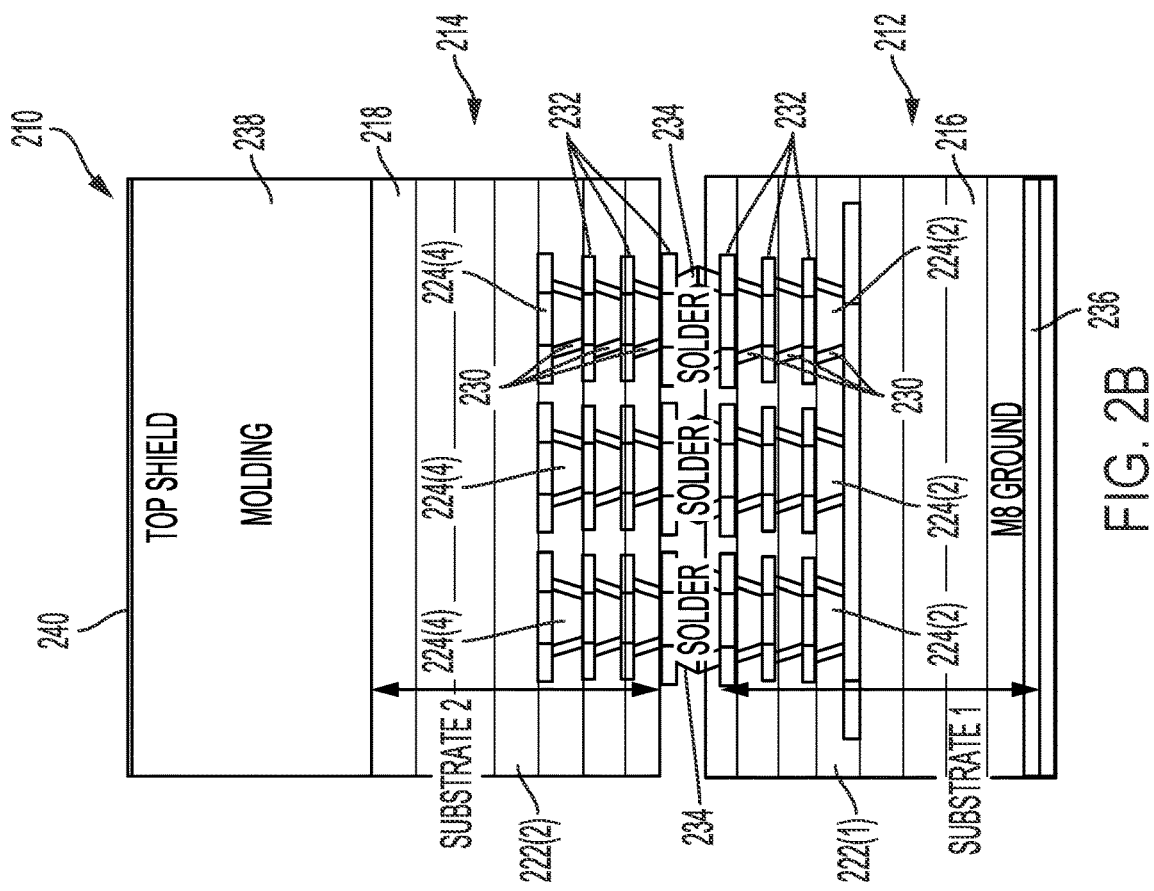
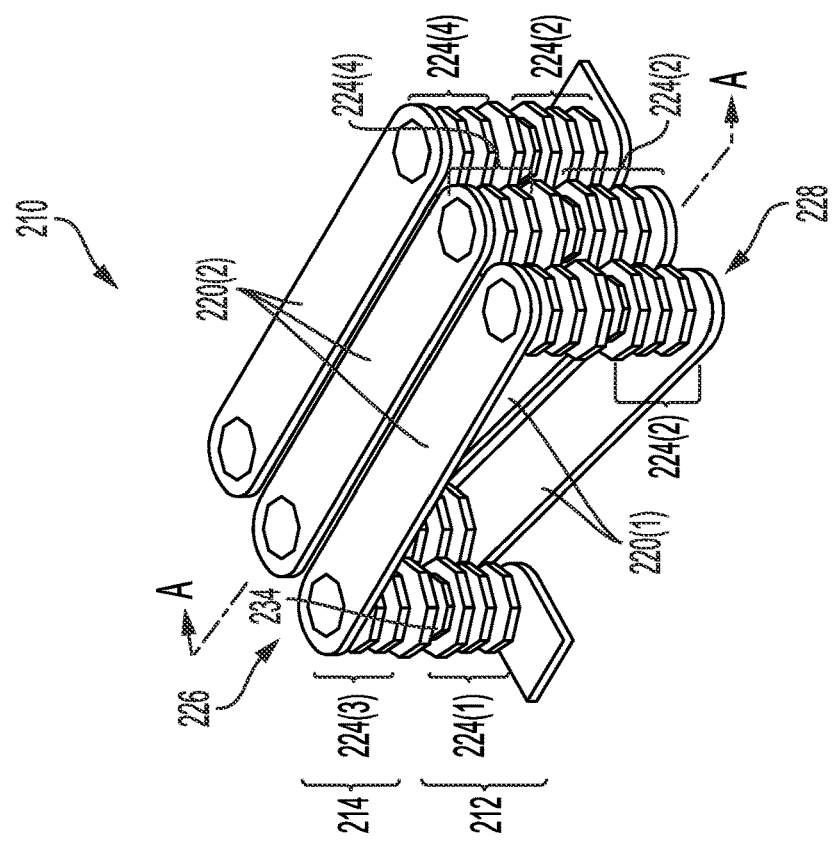

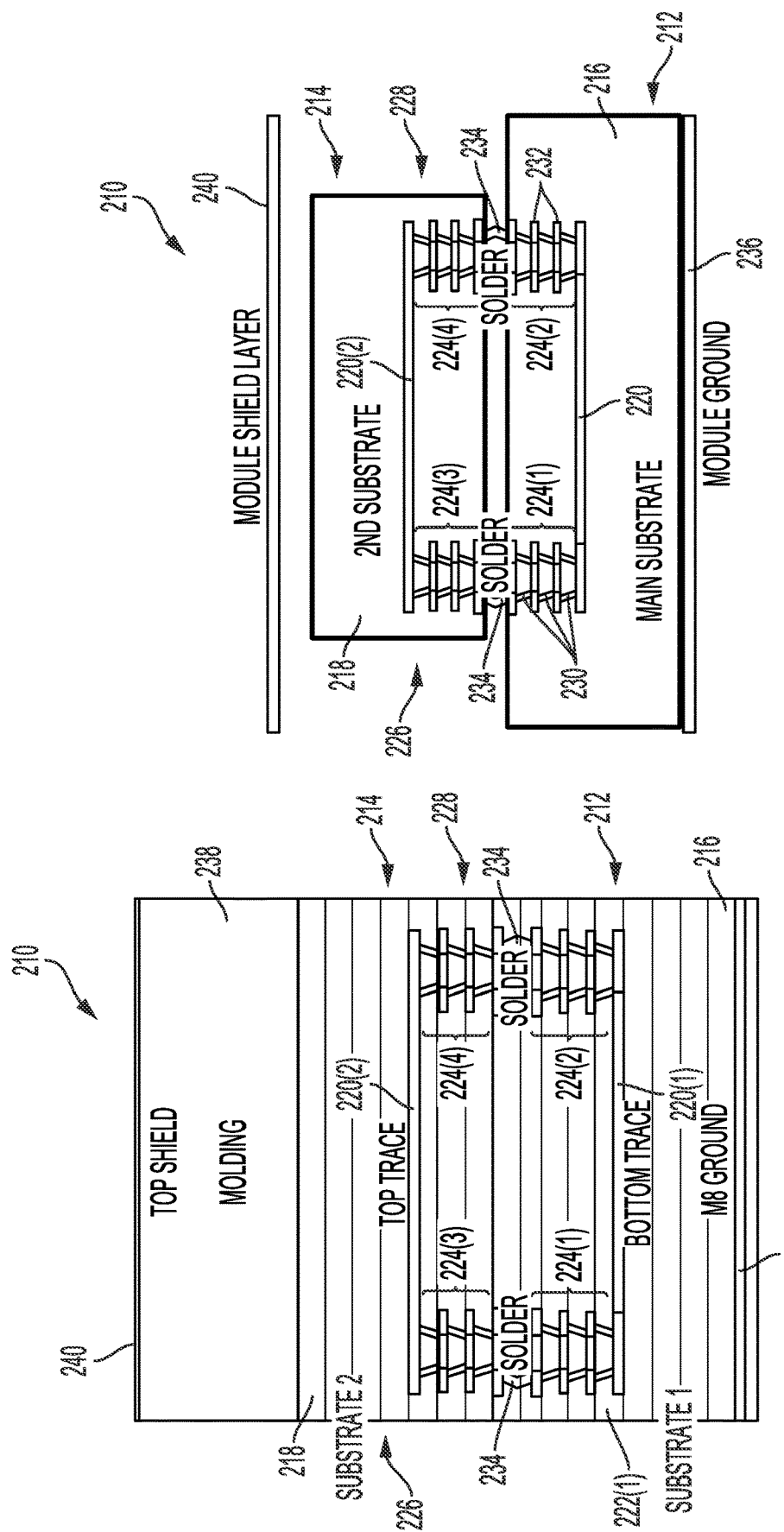

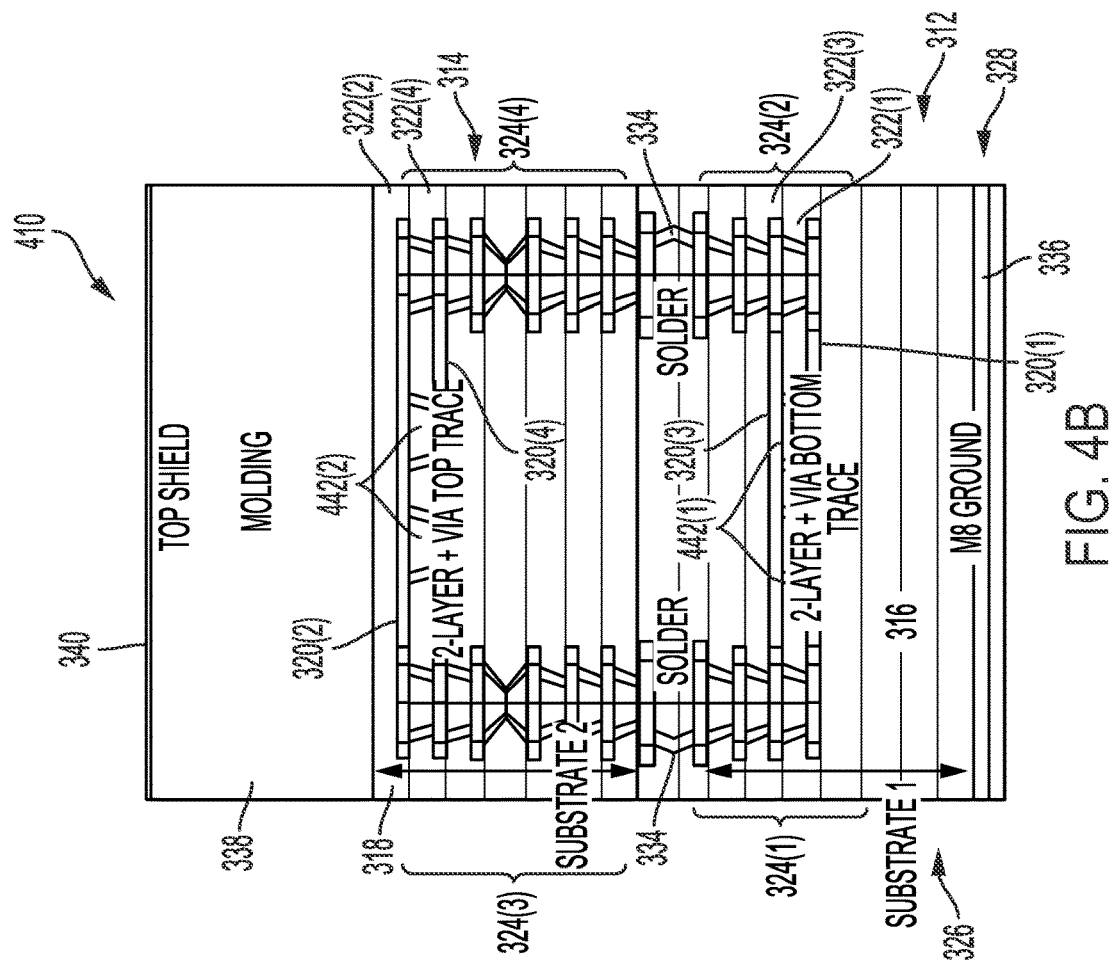
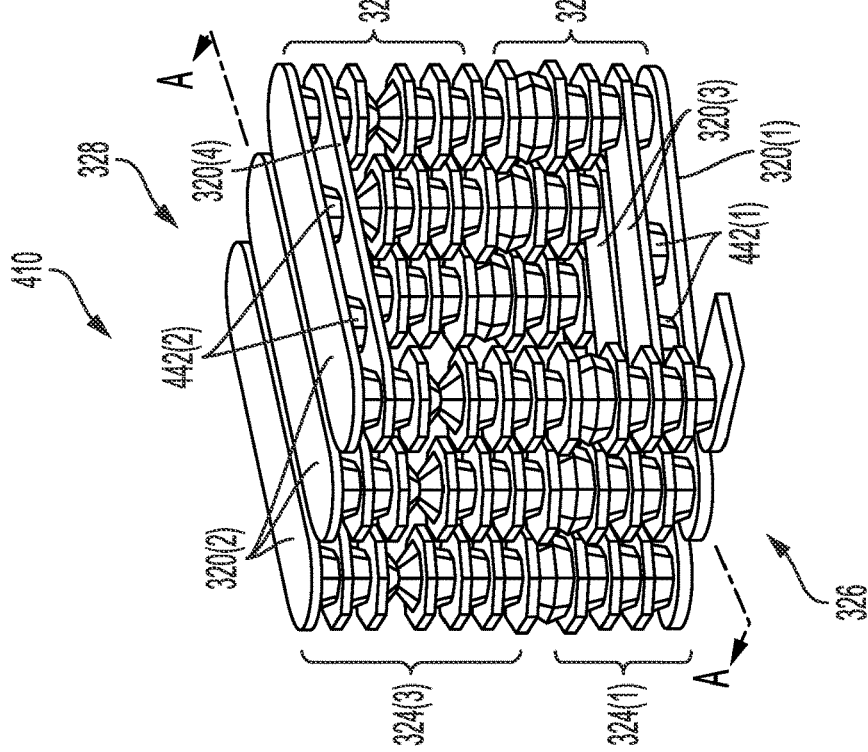
FIG. 4B
FIG. 4A

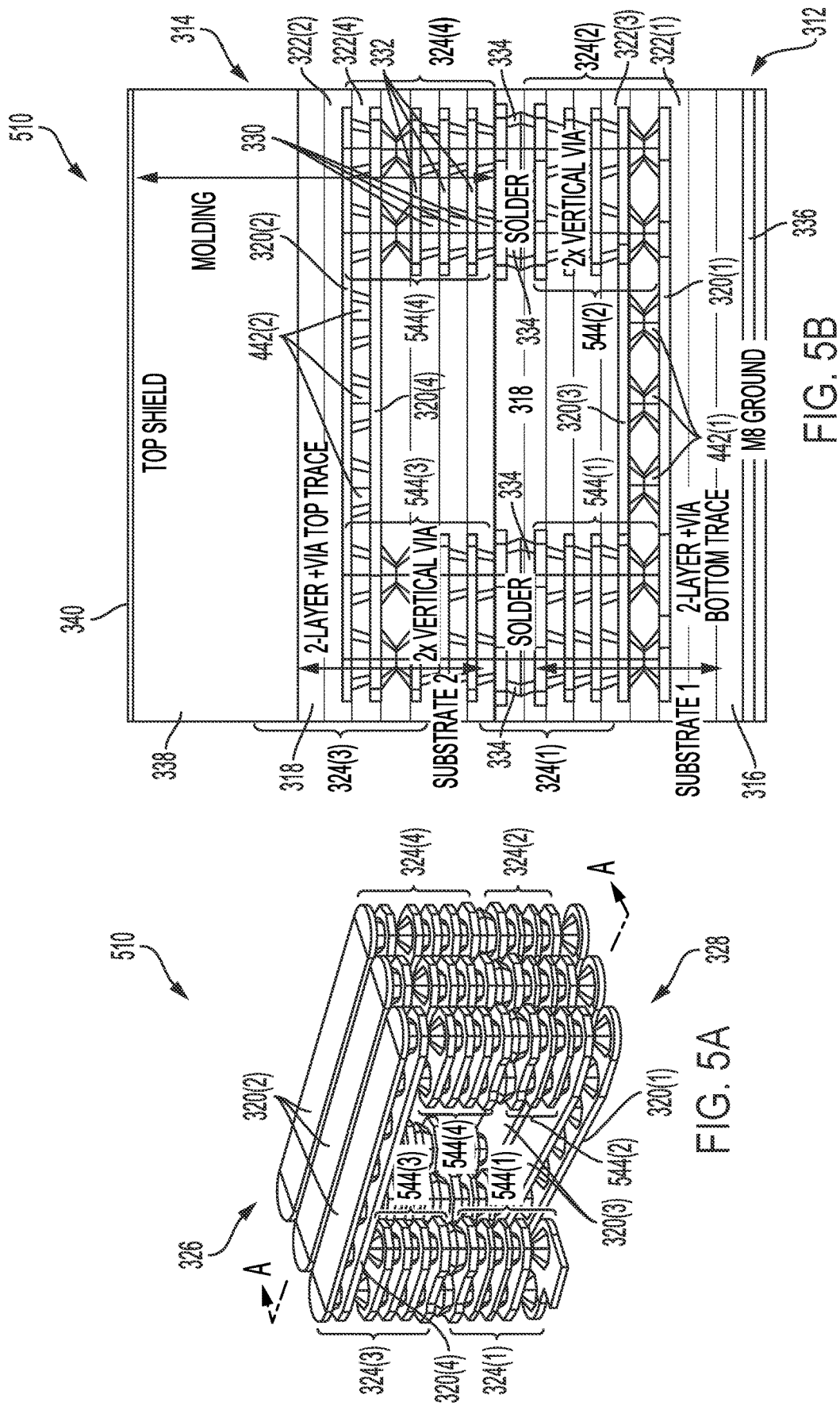

EMBEDDED VERTICAL INDUCTOR IN LAMINATE STACKED SUBSTRATES

CROSS-REFERENCE TO RELATED APPLICATIONS

The application claims the benefit of U.S. Provisional Application No. 62/599,397, filed Dec. 15, 2017, and titled "Embedded Vertical Inductor in Laminate Stacked Substrates," the disclosure of which is expressly incorporated by reference herein in its entirety.

TECHNICAL FIELD

The present disclosure generally relates to inductors, and more particularly to an embedded vertical inductor in laminate stacked substrates for high-quality (Q)-factor radio frequency (RF) applications.

BACKGROUND

Mobile radio frequency (RF) chip designs (e.g., mobile RF transceivers) have migrated to a deep sub-micron process node due to cost and power consumption considerations. The design complexity of mobile RF transceivers is complicated by added circuit functions to support communication enhancements, such as carrier aggregation. Further design challenges for mobile RF transceivers include analog/RF performance considerations, including mismatch, noise and other performance considerations. The design of mobile RF transceivers includes the use of passive devices, such as inductors and capacitors, to, for example, suppress resonance, and/or to perform filtering, bypassing and coupling. As mobile RF transceivers become more advanced and complex, various components of the mobile RF transceivers are faced with increasing size and performance constraints, such as reducing their size/footprint while maintaining or increasing their performance.

BRIEF DESCRIPTION OF THE DRAWINGS

FIG. 2A is a perspective view of a vertical inductor structure in laminate stacked substrates according to aspects of the present disclosure.

FIG. 2B is an end view of the vertical inductor structure of FIG. 2A, shown embedded in laminate stacked substrates.

FIGS. 2C and 2D are two cross-sectional views taken generally along the line A-A of FIG. 2A, showing the vertical inductor structure embedded in laminate stacked substrates.

FIG. 4A shows a perspective view of another vertical inductor structure, and

FIG. 4B shows a cross-sectional view taken generally along the line A-A of FIG. 4A, showing the vertical inductor structure embedded in laminate stacked substrates according to further aspects of the present disclosure.

FIG. 5A shows a perspective view of another vertical inductor structure, and

FIG. 5B shows a cross-sectional view taken generally along the line A-A of FIG. 5A, showing the vertical inductor structure embedded in laminate stacked substrates according to further aspects of the present disclosure.

DETAILED DESCRIPTION

Figure 1:
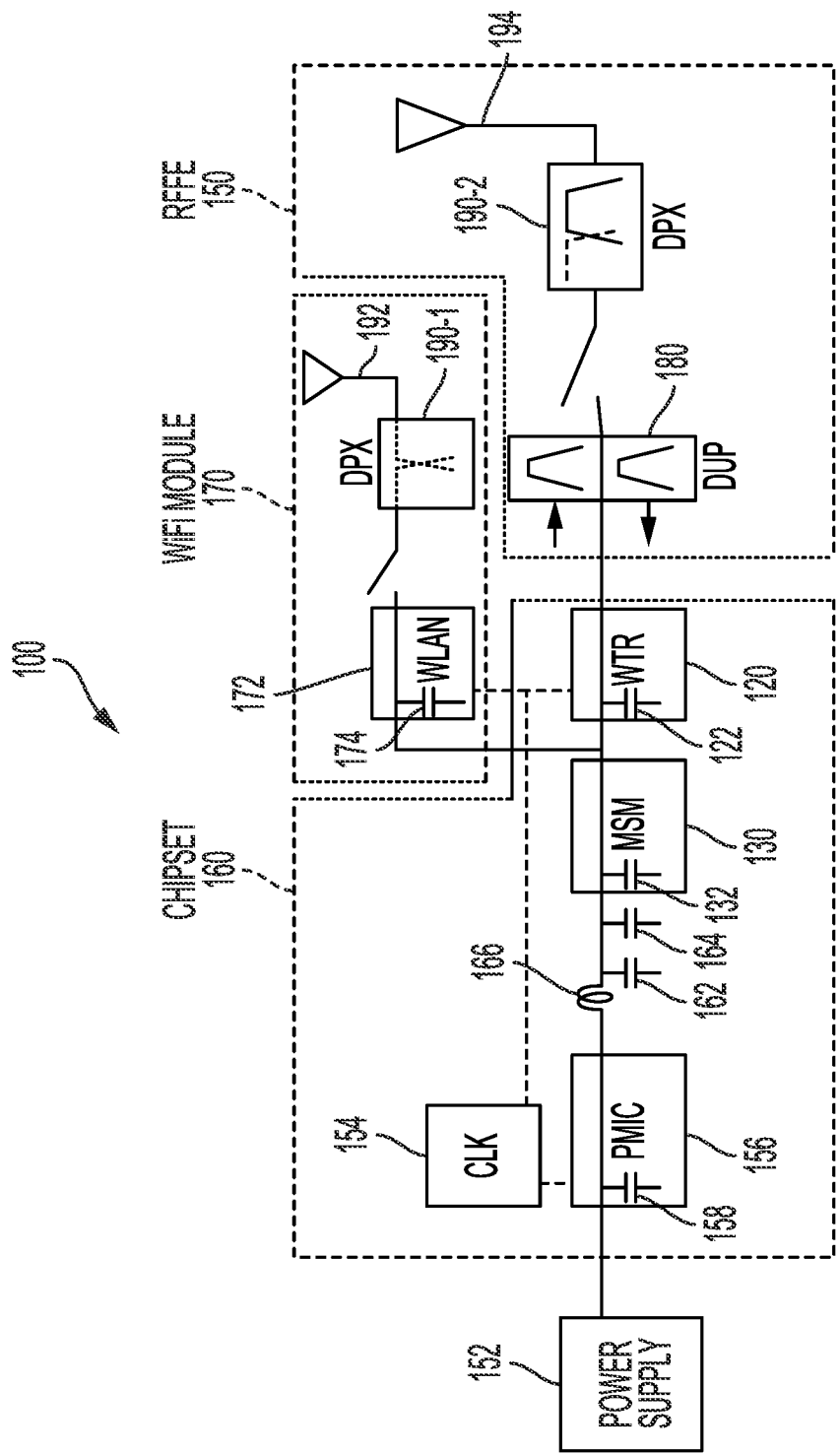
FIG. 1 is a diagram of a radio frequency (RF) communication system in accordance with an aspect of the disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts. As described herein, the use of the term "and/or" is intended to represent an "inclusive OR," and the use of the term "or" is intended to represent an "exclusive OR."

Mobile RF transceivers have migrated to a deep sub-micron process node due to cost and power consumption considerations. The design complexity of mobile RF transceivers is complicated by added circuit functions to support communication enhancements, such as carrier aggregation. Further design challenges for mobile RF transceivers include analog/RF performance considerations, including mismatch, noise and other performance considerations. The design of mobile RF transceivers includes the use of passive devices, such as inductors and capacitors, to, for example, suppress resonance, and/or to perform filtering, bypassing and coupling. As mobile RF transceivers become more advanced and complex, various components of the mobile RF transceivers are faced with increasing size and performance constraints, namely to reduce their size/footprint while maintaining or increasing their performance.

An inductor is an example of an electrical device used to temporarily store energy in a magnetic field within a wire coil according to an inductance value. This inductance value provides a measure of the ratio of voltage to the rate of change of current passing through the inductor. While the current flowing through an inductor changes, energy is temporarily stored in a magnetic field in the coil. In addition to their magnetic field storing capability, inductors are often used in alternating current (AC) electronic equipment, such as radio equipment. For example, the design of mobile RF transceivers includes the use of inductors with improved inductance density while reducing magnetic loss at high frequency (e.g., 500 megahertz (MHz) to 5 gigahertz (GHz) RF range).

According to aspects of the present disclosure, a duplexer may be arranged in a power amplifier (PA) integrated duplexer (PAMID) module or a front-end module with integrated duplexer (FEMID) module, in which the duplexer is integrated with a laminate substrate inductor, such as a laminate integrated inductor. The use of single substrate laminate integrated inductors may replace the use of surface mount devices within RF front-end modules due to spacing constraints. Unfortunately, the area occupied by the laminate integrated inductors within a substrate (e.g., a package substrate) may also be constrained due to customer specifications. For example, the substrate generally includes ground planes to meet isolation specifications to avoid interference between the laminate integrated inductors and the duplexers. In addition, a vertical height of the inductor may be restricted due to customer specifications. Unfortunately, the ground planes of the substrate may compress a magnetic field of the single substrate laminate integrated inductors, which reduces the quality (Q)-factor when the laminate integrated inductors are arranged within a single laminate substrate.

Aspects of the present disclosure describe a vertical inductor structure embedded in laminate stacked substrates for high Q-factor RF applications. In one arrangement a vertical inductor structure includes a first laminate substrate forming a first portion of the vertical inductor structure and a second laminate substrate forming a second portion of the vertical inductor structure. The second laminate substrate is mounted on the first laminate substrate. Each of the first and second laminate substrates includes a plurality of traces embedded in a layer of the laminate substrate, a plurality of first vertical columns and a plurality of second vertical columns. Each of the traces is coupled at a first end to one of the first vertical columns and at a second end to one of the second vertical columns. The second laminate substrate is mounted on the first laminate substrate, such that each of the first vertical columns of the first laminate substrate is coupled to a respective first vertical column of the second laminate substrate, and each of the second vertical columns of the first laminate substrate is coupled to a respective second vertical column of the second laminate substrate.

In contrast to a conventional single substrate laminate inductor, the improved inductor design is a vertical inductor embedded in multiple laminate stacked substrates. Embedding the vertical inductor in two laminate substrates provides flexibility to achieve a targeted inductor performance at a reduced inductor footprint. Each laminate substrate may have any number of layers, for example between two layers and ten layers, and the vertical height of the inductor structure may range between 50 µm and 600 µm and be optimized to achieve a particular Q-factor. In addition, layers in the first laminate substrate may provide a desired separation between the inductor and the ground plane of the substrate, so that the magnetic field of the inductor is not compressed, thereby improving the Q-factor of the inductor. Similarly, above the top surface of the inductor, additional layers or molding may be provided to distance the inductor from the module shield ground, so as not to compress the magnetic field of the inductor at the upper end. An improved vertical inductor structure having an area of less than 0.6 mm² may have a Q-factor of up to 40 for 2.5 nH at 800 MHz and 85□.

One goal driving the wireless communications industry is providing customers with increased bandwidth. The use of carrier aggregation in current generation communications provides one possible solution for achieving this goal. For wireless communication, passive devices are used to process signals in carrier aggregation systems. In these carrier aggregation systems, signals are communicated with both high band and low band frequencies. In a RF front-end (RFFE) module, a power amplifier (PA) may be integrated with a passive device (e.g., a duplexer) to provide a PAMID module. In addition, a front-end module may be integrated with a duplexer to provide a FEMID module. A duplexer (e.g., an acoustic filter) may be configured for simultaneous transmission and reception within the same band (e.g., a low band) to support carrier aggregation.

FIG. 1 is a schematic diagram of a RF communications system 100 including a vertical inductor structure integrated with a duplexer 180 according to an aspect of the present disclosure. Representatively, the RF communications system 100 includes a WiFi module 170 having a first duplexer 190-1 and an RF front-end module 150 including a second duplexer 190-2 for a chipset 160 to provide carrier aggregation according to an aspect of the present disclosure. The WiFi module 170 includes the first diplexer 190-1 communicably coupling an antenna 192 to a wireless local area network module (e.g., WLAN module 172). The RF front-end module 150 includes the second diplexer 190-2 communicably coupling an antenna 194 to a wireless transceiver (WTR) 120 through the duplexer 180. The wireless transceiver 120 and the WLAN module 172 of the WiFi module 170 are coupled to a modem (mobile station modem (MSM), e.g., baseband modem) 130 that is powered by a power supply 152 through a power management integrated circuit (PMIC) 156.

The chipset 160 also includes capacitors 162 and 164, as well as an inductor(s) 166 to provide signal integrity. The PMIC 156, the modem 130, the wireless transceiver 120, and the WLAN module 172 each include capacitors (e.g., 158, 132, 122, and 174) and operate according to a clock 154. The geometry and arrangement of the various inductor and capacitor components in the chipset 160 may reduce the electromagnetic coupling between the components. The RF communications system 100 may also include a power amplifier (PA) integrated with the duplexer 180 (e.g., a PAMID module). The duplexer 180 may filter the input/ output signals according to a variety of different parameters, including frequency, insertion loss, rejection, or other like parameters. According to aspects of the present disclosure, the duplexer 180 may be integrated with an embedded vertical inductor in laminate stacked substrates, for example, as shown in FIGS. 2A-5B.

FIG. 2A shows a perspective view of a vertical inductor structure 210 according to aspects of the present disclosure. FIGS. 2B-2D show end and cross-sectional views of the vertical inductor structure 210 embedded in laminate stacked substrates. The vertical inductor structure 210 may include a first portion 212 and a second portion 214. The first portion 212 of the vertical inductor structure 210 may be formed in a first laminate substrate 216, and the second portion 214 may be formed in a second laminate substrate 218. Each of the first laminate substrate 216 and the second laminate substrate 218 may have any number of a plurality of layers, for example, between 2 layers and 10 layers. For example, the first laminate substrate 216 may include 8 layers, while the second laminate substrate 218 may include the same number of layers, in this example, 8 layers, or the second laminate substrate 218 may include more or fewer layers than the first laminate substrate 216.

The first laminate substrate 216 and the second laminate substrate 218 may include a plurality of traces 220(1) and 220(2), respectively, that form part of the vertical inductor structure 210. Each of the traces 220(1), 220(2) may be provided in a single layer 222(1), 222(2), respectively, of the respective first laminate substrate 216 and the second laminate substrate 218. As shown in FIGS. 2A-2D, the traces 220(1) of the first laminate substrate 216 may form the bottom traces of the vertical inductor structure 210, while the traces 220(2) of the second laminate substrate 218 may form the top traces of the vertical inductor structure 210. The traces 220(1), 220(2) may be comprised of copper or any other conductive material.

The first laminate substrate 216 may further include vertical columns 224(1), 224(2) that are coupled to the traces 220(1) at a respective first end 226 and second end 228. Similarly, the second laminate substrate 218 may include vertical columns 224(3), 224(4) that are coupled to the traces 220(2) at the respective first end 226 and second end 228. The vertical columns 224(1)-224(4) may be comprised of stacked, metal-filled vias 230 and capture pads 232. Copper is one conductive metal that may be used to form the metal-filled vias 230 and capture pads 232 of the vertical columns 224(1)-224(4), however, other conductive materials may also be used.

The second laminate substrate 218 may be mounted on the first laminate substrate 216 to complete the vertical inductor structure 210. At the first end 226, each of the vertical columns 224(1) of the first laminate substrate 216 may be electrically and mechanically coupled to a respective vertical column 224(3) of the second laminate substrate 218 by a bump 234. Similarly, at the second end 228, each of the vertical columns 224(2) of the first laminate substrate 216 may be electrically and mechanically coupled to a respective vertical column 224(4) of the second laminate substrate 218 by a bump 234. The bumps 234 may be solder balls and composed of a conductive material. Alternatively, the bumps 234 may be other types of bumps that provide electrical and mechanical connections, such as flip-chip bumps, ball grid array bumps, solder on pads (SOP), or copper pillars.

Referring still to FIGS. 2B-2D, the vertical inductor structure 210 may include an optional module ground 236. The module ground 236 may be formed in the bottom-most M8 layer of the first laminate substrate 216. The vertical inductor structure 210 may further include a molding 238 that is provided over and/or around the second laminate substrate 218 as well as a module shield layer 240. The molding 238 may be comprised of a polymer material.

As mentioned above, each of the first laminate substrate 216 and the second laminate substrate 218 may be provided with any multiple number of layers. For example, in FIGS. 2B and 2C, the first laminate substrate 216 includes 4 layers that separate the bottom traces 220(1) of the vertical inductor structure 210 from the module ground 236. The distance between the bottom traces 220(1) of the vertical inductor structure 210 and the module ground 236 maybe adjusted by increasing or decreasing the number of layers provided therebetween to prevent magnetic field compression and coupling from the module ground 236. The second laminate substrate 218, in FIGS. 2B and 2C is also shown as having 4 layers that separate the top traces 220(2) of the vertical inductor structure 210 from the molding 238. These layers of the second laminate substrate 218 along with the molding 238 may provide a separation between the top traces 220(2) of the vertical inductor structure 210 and the module shield layer 240 to also prevent magnetic field compression and coupling from the module shield. It should be noted, that the second laminate substrate 218 may be provided with fewer or more layers above the top traces 220(2) of the vertical inductor structure 210, and instead the thickness of the molding 238 may be increased or decreased to achieve the desired separation from the module shield layer 240.

Aspects of the present disclosure provide the multi-substrate vertical inductor structure 210 with a flexible design that has a smaller footprint than a comparably performing single substrate inductor or one formed in a through glass via (TGV) or through substrate via (TSV) module. For example, the height of vertical columns 224(1)-224(4) may be anywhere in the range of 50 μm to 600 μm to achieve a target inductor performance. In addition, the additional layers or molding 238 may be used to distance the traces 220(1), 220(2) of the vertical inductor structure 210 from the module ground 236 and the module shield layer 240.

Figures 3A, 3B:
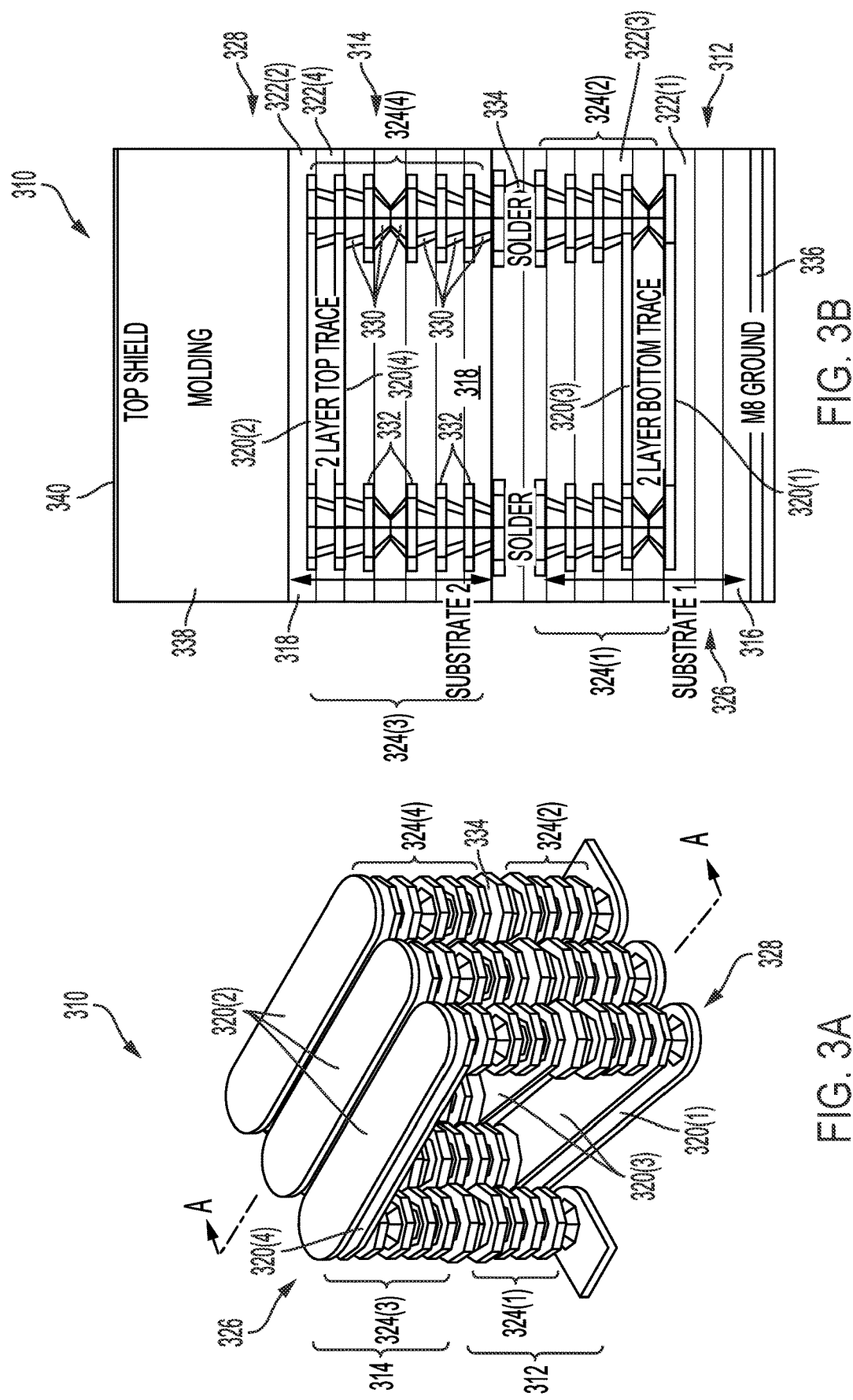
FIG. 3A shows a perspective view of another vertical inductor structure.
FIG. 3B shows a cross-sectional view taken generally along the line A-A of FIG. 3A, showing the vertical inductor structure embedded in laminate stacked substrates according to aspects of the present disclosure.

FIG. 3A shows a perspective view of a vertical inductor structure 310 according to other aspects of the present disclosure, and FIG. 3B shows a cross-sectional view of the vertical inductor structure 310 embedded in laminate stacked substrates. The vertical inductor structure 310 is similar to the vertical inductor structure 210 of FIGS. 2A-2D, except that the vertical inductor structure 310 includes two layers of traces in each laminate substrate.

The vertical inductor structure 310 may include a first portion 312 formed in a first laminate substrate 316 and a second portion 314 formed in a second laminate substrate 318. Each of the first laminate substrate 316 and the second laminate substrate 318 may have any number of a plurality of layers, for example, between 2 layers and 10 layers, and need not have the same number of layers as the other laminate substrate.

The first laminate substrate 316 and the second laminate substrate 318 may include a plurality of first traces 320(1) and 320(2), respectively, and a plurality of second traces 320(3) and 320(4), respectively, that form part of the vertical inductor structure 310. Each of the first traces 320(1), 320(2) may be provided in a single layer 322(1), 322(2), respectively, of the respective first laminate substrate 316 and the second laminate substrate 318. Similarly, each of the second traces 320(3), 320(4) may be provided in an another single layer 322(3), 322(4), respectively, of the respective first laminate substrate 316 and the second laminate substrate 318. The traces 320(1)-320(4) may be comprised of copper or any other conductive material.

The first laminate substrate 316 may further include vertical columns 324(1) that are coupled to the first traces 320(1) and the second traces 320(3) at a first end 326, and vertical columns 324(2) that are coupled to the first traces 320(1) and the second traces 320(3) at a second end 328. Similarly, the second laminate substrate 318 may include vertical columns 324(3) that are coupled to the first traces 320(2) and the second traces 320(4) at the first end 326, and vertical columns 324(4) that are coupled to the first traces 320(2) and the second traces 320(4) at the second end 328. The vertical columns 324(1)-324(4) may be made of copper or any other conductive material and may be comprised of stacked, metal-filled vias and capture pads.

The second laminate substrate 318 may be mounted on the first laminate substrate 318 to complete the vertical inductor structure 310. At the first end 326, each of the vertical columns 324(1) of the first laminate substrate 316 may be electrically and mechanically coupled to a respective vertical column 324(3) of the second laminate substrate 318 by a bump 334. Similarly, at the second end 328, each of the vertical columns 324(2) of the first laminate substrate 316 may be electrically and mechanically coupled to a respective vertical column 324(4) of the second laminate substrate 318 by a bump 334. The bumps 334 may be solder balls and are composed of a conductive material. Alternatively, the bumps 334 may be other types of bumps that provide electrical and mechanical connections, such as flip-chip bumps, ball grid array bumps, solder on pads (SOP), or copper pillars.

Like the vertical inductor structure 210 of FIGS. 2A-2D, the vertical inductor structure 310 may also be provided with an optional module ground 336 from the bottom layer of the first laminate substrate 316, molding 338 and a module shield layer 340. As mentioned above, the first laminate substrate 316 may be provided with additional layers below the first traces 320(1) to provide a desired distance between the module ground 336 and the vertical inductor structure 310. Similarly, the second laminate substrate 318 may be provided with additional layers above the first traces 320(2) and/or the thickness of the molding 338 may be increased/decreased to adjust a distance between the vertical inductor structure 310 and the module shield layer 340.

FIG. 4A shows a perspective view of a vertical inductor structure 410 according to still other aspects of the present disclosure, and FIG. 4B shows a cross-sectional view of the vertical inductor structure 410 embedded in laminate stacked substrates. The vertical inductor structure 410 is similar in many ways to the vertical inductor structure 310 of FIGS. 3A-3B, and, for simplicity, the same reference numerals will be used for like parts. The difference between the two vertical inductor structures is that the vertical inductor structure 410 may further include metal-filled vias 442 coupling the two layers of traces in each laminate substrate. The first laminate substrate 316 may include metal-filled vias 442(1) that couple the first traces 320(1) of the first laminate substrate 316 to the second traces 320(3). Similarly, the second laminate substrate 318 may include metal-filled vias 442(2) that couple the first traces 320(2) of the second laminate substrate 318 to the second traces 320(4). The metal-filled vias 442(1), 442(2) are coupled to the respective first traces 320(1), 320(2) and the respective second traces 320(3), 320(4) between the first end 326 and the second end 328. The metal-filled vias 442(1), 442(2) improve the inductance of the traces 320(1)-320(4). Any number of metal-filled vias 442(1), 442(2) may be provided along the traces 320(1)-320(4). For example, although the vertical inductor structure 410 is shown in FIG. 4B having 2 metal-filled vias 442(1), 442(2) between the first traces 320(1), 320(2) and the second traces 320(3), 320(4), more than 2 metal-filled vias 442(1), 442(2) may be provided between the traces 320(1)-320(4). Alternatively, the vertical inductor structure 410 may include a single metal-filled via 442(1), 442(2) may between the first traces 320(1), 320(2) and the second traces 320(3), 320(4). The metal-filled vias 442(1), 442(2) may be composed of copper or any other conductive material.

FIG. 5A shows a perspective view of a vertical inductor structure 510 according to still other aspects of the present disclosure, and FIG. 4B shows a cross-sectional view of the vertical inductor structure 510 embedded in laminate stacked substrates. The vertical inductor structure 510 is very similar to the vertical inductor structure 410 of FIGS. 4A-4B, and, for simplicity, the same reference numerals will again be used for like parts. The difference between the two vertical inductor structures is that the vertical inductor structure 510 may further include additional vertical columns to couple the first traces 320(1) and the second traces 320(3) of the first laminate substrate 316 to the first traces 320(2) and the second traces 320(4) of the second laminate substrate 318.

In addition to the vertical columns 324(1), 324(2), the first laminate substrate 316 may further include vertical columns 544(1), 544(2). The vertical columns 544(1) are coupled to the traces 320(1), 320(3) proximate the first end 326, while the vertical columns 544(2) are coupled to the traces 320(1), 320(3) proximate the second end 328. Similarly, the second laminate substrate 318 may include vertical columns 544(3), 544(4) that are coupled to the traces 320(2), 320(4) proximate the first end 326 and the second end 328, respectively.

The vertical columns 544(1)-544(4) may be comprised of stacked, metal-filled vias 330 and capture pads 332. Copper is one conductive metal that may be used to form the metal-filled vias 330 and capture pads 332 of the vertical columns 544(1)-544(4), however, other conductive materials may also be used. The vertical columns 544(1)-544(4) reduce the resistance in the vertical portion of the vertical inductor structure 510.

The second laminate substrate 318 may be mounted on the first laminate substrate 316 to complete the vertical inductor structure 510. At the first end 326, bumps 334 may electrically and mechanically couple each of the vertical columns 324(1), 544(1) of the first laminate substrate 316 to a respective vertical column 324(3), 544(3) of the second laminate substrate 318. Similarly, at the second end 328, bumps 334 may electrically and mechanically couple each of the vertical columns 324(2), 544(2) of the first laminate substrate 316 to a respective vertical column 324(4), 544(4) of the second laminate substrate 318. The bumps 334 may be solder balls and composed of a conductive material. Alternatively, the bumps 234 may be other types of bumps that provide electrical and mechanical connections, such as flip-chip bumps, ball grid array bumps, solder on pads (SOP), or copper pillars.

Figure 6:
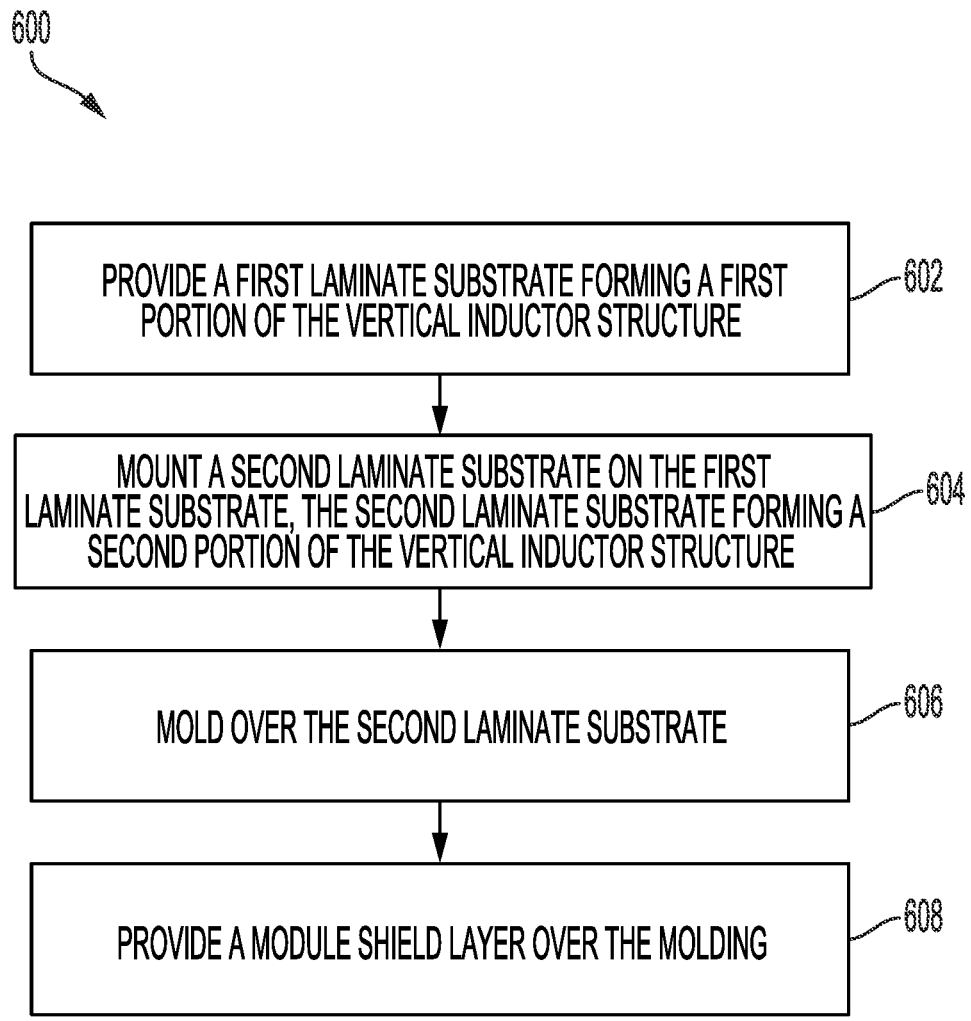
FIG. 6 is a flow diagram illustrating a method of fabricating an embedded vertical inductor structure in laminate stacked substrates according to aspects of the disclosure.

FIG. 6 is a flow diagram illustrating a method 600 of fabricating an embedded vertical inductor structure in laminate stacked substrate according to aspects of the disclosure. At block 602, a first laminate substrate 216, 316 forming a first portion of the vertical inductor structure is provided. The first laminate substrate may be the first laminate substrate 216 of the vertical inductor structure 210 of FIGS. 2A-2D with a single layer of traces 220(1). Alternatively, the first laminate substrate 316 may be provided with any one of the following: two layers of traces 320(1), 320(3), as in the vertical inductor structure 310 of FIGS. 3A-3B; two layers of traces 320(1), 320(3) and metal-filled vias 442(1) coupling the first and second traces 320(1) and 320(3), respectively, as in the vertical inductor structure 410 of FIGS. 4A-4B; and two layers of traces 320(1), 320(3), metal-filled vias 442(1), and additional vertical columns 544(1), 544(2), as in the vertical inductor structure 510 of FIGS. 5A-5B. The first laminate structure may also be provided with an optional module ground 236, 336.

At block 604, a second laminate substrate 218, 318 may be provided on the first laminate substrate 216, 316. The second laminate substrate 218, 318 forms a second portion of the vertical inductor structure. The second laminate substrate may be the second laminate substrate 218 of the vertical inductor structure 210 of FIGS. 2A-2D with a single layer of traces 220(2). Alternatively, the second laminate substrate 318 may be provided with any one of the following: two layers of traces 320(2), 320(4), as in the vertical inductor structure 310 of FIGS. 3A-3B; two layers of traces 320(2), 320(4) and metal-filled vias 442(2) coupling the first and second traces 320(2) and 320(4), respectively, as in the vertical inductor structure 410 of FIGS. 4A-4B; and two layers of traces 320(2), 320(4), metal-filled vias 442(2), and additional vertical columns 544(3), 544(4), as in the vertical inductor structure 510 of FIGS. 5A-5B.

The second laminate substrate 218, 318 is electrically and mechanically coupled to the first laminate substrate 216, 316 using bumps 234, 334. The bumps 234, 334 may be solder balls and composed of a conductive material. Alternatively, the bumps 234, 334 may be other types of bumps that provide electrical and mechanical connections, such as flip-chip bumps, ball grid array bumps, solder on pads (SOP), or copper pillars.

At block 606, molding 238, 338 is provided over the first laminate substrate 216, 316 and around the second laminate substrate 218, 318. The molding also fills the gap between the first laminate substrate 216, 316 and the second laminate substate 218, 318. The molding 238, 338 is composed of a polymer material.

At block 608, a module shield layer 240, 340 may be provided over the molding 238, 338. At step 606, the thickness of the molding, 338 may be controlled to provide a desired separation between the top traces 220(2), 320(3) of the vertical inductor structure 210, 310, 410, 510 and the module shield layer 240, 340 so as not to compress the magnetic field of the vertical inductor structure.

Figure 7:
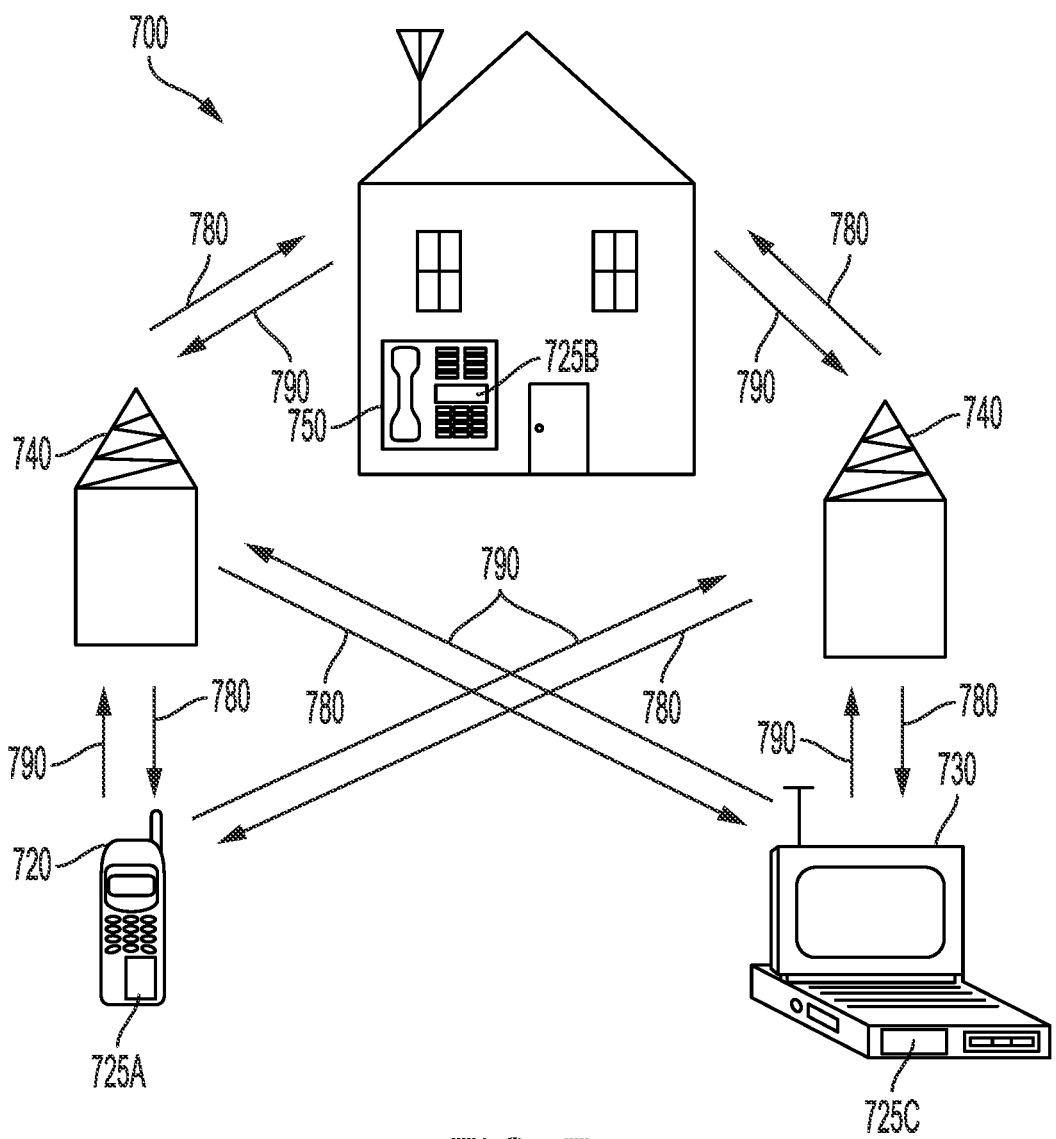
FIG. 7 is a block diagram showing an exemplary wireless communication system in which a configuration of the disclosure may be advantageously employed.

FIG. 7 is a block diagram showing an exemplary wireless communication system 700 in which an aspect of the disclosure may be advantageously employed. For purposes of illustration, FIG. 7 shows three remote units 720, 730 and 750 and two base stations 740. It will be recognized that wireless communication systems may have many more remote units and base stations. Remote units 720, 730 and 750 each include IC devices 725A, 725C, and 725B having a RF front-end module that includes the disclosed inductors. It will be recognized that other devices may also include the disclosed inductors, such as the base stations, switching devices, and network equipment including a RF front-end module. FIG. 7 shows forward link signals 780 from the base station 740 to the remote units 720, 730 and 750 and reverse link signals 790 from the remote units 720, 730 and 750 to the base stations 740.

In FIG. 7 a remote unit 720 is shown as a mobile telephone, remote unit 730 is shown as a portable computer, and remote unit 750 is shown as a fixed location remote unit in a wireless local loop system. For example, the remote units 720, 730 and 750 may be a mobile phone, a hand-held personal communications systems (PCS) unit, a portable data unit such as a personal digital assistant (PDA), a GPS enabled device, a navigation device, a set top box, a music player, a video player, an entertainment unit, a fixed location data unit such as a meter reading equipment, or a communications device, including an RF front-end module that stores or retrieves data or computer instructions, or combinations thereof. Although FIG. 7 illustrates remote units according to the aspects of the disclosure, the disclosure is not limited to these exemplary illustrated units. Aspects of the disclosure may be suitably employed in many devices, which include the disclosed devices.

Figure 8:
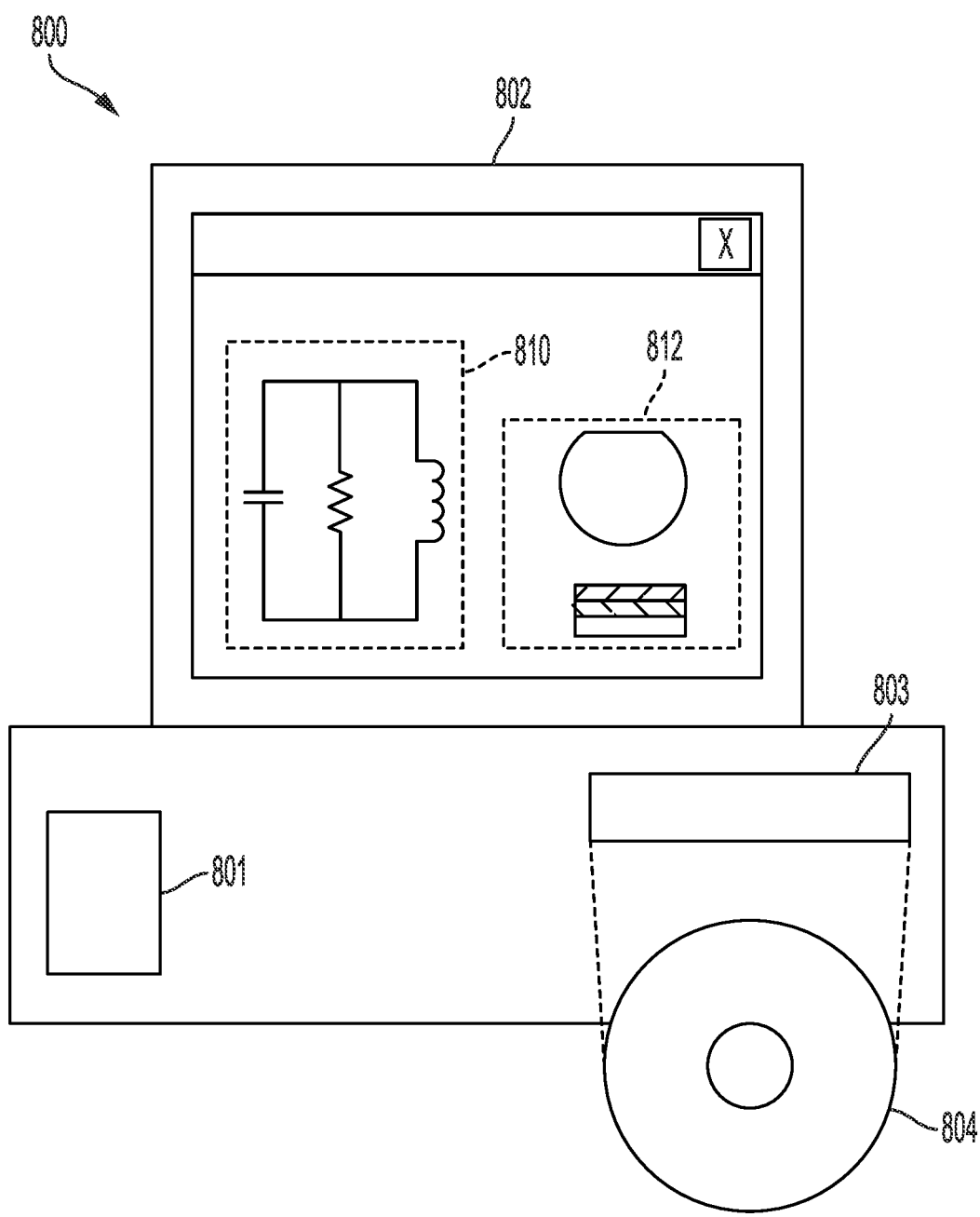
FIG. 8 is a block diagram illustrating a design workstation used for circuit, layout, and logic design of a semiconductor component according to one configuration.

FIG. 8 is a block diagram illustrating a design workstation used for circuit, layout, and logic design of a semiconductor component, such as the inductors disclosed above. A design workstation 800 includes a hard disk 802 containing operating system software, support files, and design software such as Cadence or OrCAD. The design workstation 800 also includes a display 804 to facilitate design of a circuit 806 or a semiconductor component 808 such as an inductor. A storage medium 810 is provided for tangibly storing the design of the circuit 806 or the semiconductor component 808. The design of the circuit 806 or the semiconductor component 808 may be stored on the storage medium 810 in a file format such as GDSII or GERBER. The storage medium 810 may be a CD-ROM, DVD, hard disk, flash memory, or other appropriate device. Furthermore, the design workstation 800 includes a drive apparatus 812 for accepting input from or writing output to the storage medium 810.

Data recorded on the storage medium 810 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 810 facilitates the design of the circuit 806 or the semiconductor component 808 by decreasing the number of processes for designing semiconductor wafers.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structure and that can be accessed by a computer; disk and disc, as used herein, includes compact disc (CD), laser disc, optical disc, digital versatile disc (DVD) and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communications apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose process, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description is provided to enable any person skilled in the art to practice the various aspects described herein. Various modifications to these aspects will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A vertical inductor structure, comprising:
   a first laminate substrate having a ground plane layer internal to the first laminate substrate;
   a first portion of the vertical inductor structure formed within the first laminate substrate, spaced apart from the ground plane layer, and located between the ground plane layer and an exterior surface of the first laminate substrate;
   a second laminate substrate mounted on the first laminate substrate;
   a second portion of the vertical inductor structure formed within the second laminate substrate,
   each respective laminate substrate of the first laminate substrate and the second laminate substrate including:
      a plurality of first traces embedded in a layer of the respective laminate substrate;
      a plurality of first vertical columns, each of which is coupled to a first end of a respective one of the plurality of first traces; and
      a plurality of second vertical columns, each of which is coupled to a second end of the respective one of the plurality of first traces,
   wherein the second laminate substrate is mounted on the first laminate substrate such that each of the plurality of first vertical columns of the first laminate substrate is coupled to a respective one of the plurality first vertical columns of the second laminate substrate, and each of the plurality of second vertical columns of the first laminate substrate is coupled to a respective one of the plurality of second vertical columns of the second laminate substrate; and
   wherein the exterior surface of the first laminate substrate faces the second laminate substrate.

2. The vertical inductor structure of claim 1, wherein each of the first laminate substrate and the second laminate substrate includes a plurality of second traces, the plurality of second traces are parallel with the plurality of first traces and embedded in a second layer of the substrate.

3. The vertical inductor structure of claim 2, wherein each of the first laminate substrate and the second laminate substrate further includes a plurality of metal-filled vias disposed along each of the plurality of first traces between the first end and the second end, the plurality of metal-filled vias coupling each of the plurality of first traces to a respective one of the plurality of second traces.

4. The vertical inductor structure of claim 2, wherein each of the first laminate substrate and the second laminate substrate further includes:
   a plurality of third vertical columns, each of which is coupled to a respective one of the plurality of first traces proximate the first end; and
   a plurality of fourth vertical columns, each of which is coupled to a respective one of the plurality of first traces proximate the second end,
   wherein each of the plurality of third vertical columns of the first laminate substrate is coupled to a respective one of the plurality of third vertical columns of the second laminate substrate, and each of the plurality of fourth vertical columns of the first laminate substrate is coupled to a respective one of the plurality of fourth vertical columns of the second laminate substrate.

5. The vertical inductor structure of claim 1, wherein each of the plurality of first and second vertical columns includes a plurality of stacked, metal-filled vias embedded in the respective laminate substrate.

6. The vertical inductor structure of claim 5, wherein each of the plurality of first and second vertical columns further includes a plurality of capture pads embedded in the respective laminate substrate, each of the plurality of capture pads disposed between each of the plurality of stacked, metal-filled vias.

7. The vertical inductor structure of claim 1, wherein the first laminate substrate is coupled to the second laminate substrate using connections selected from the group consisting of flip-chip bumps, ball grid arrays, solder on pad (SOP), and copper pillars.

8. The vertical inductor structure of claim 1, further comprising a shield layer and a molding, the molding separating the second laminate substrate from the shield layer.

9. The vertical inductor structure of claim 8, wherein the molding is comprised of a polymer material.

10. The vertical inductor structure of claim 1, wherein the first laminate substrate includes a first number of layers, and the second laminate substrate includes a second number of layers.

11. The vertical inductor of claim 10, wherein each of the first number of layers and the second number of layers is in the range of 2 layers to 10 layers.

12. The vertical inductor structure of claim 10, wherein the first number of layers equals the second number of layers.

13. The vertical inductor structure of claim 10, wherein the plurality of first traces are comprised of copper.

14. The vertical inductor structure of claim 1, integrated into a radio frequency (RF) front-end module, the RF front-end module incorporated into at least one of a music player, a video player, an entertainment unit, a navigation device, a communications device, a personal digital assistant (PDA), a fixed location data unit, a mobile phone, and a portable computer.

\* \* \* \* \*